Figure 1:
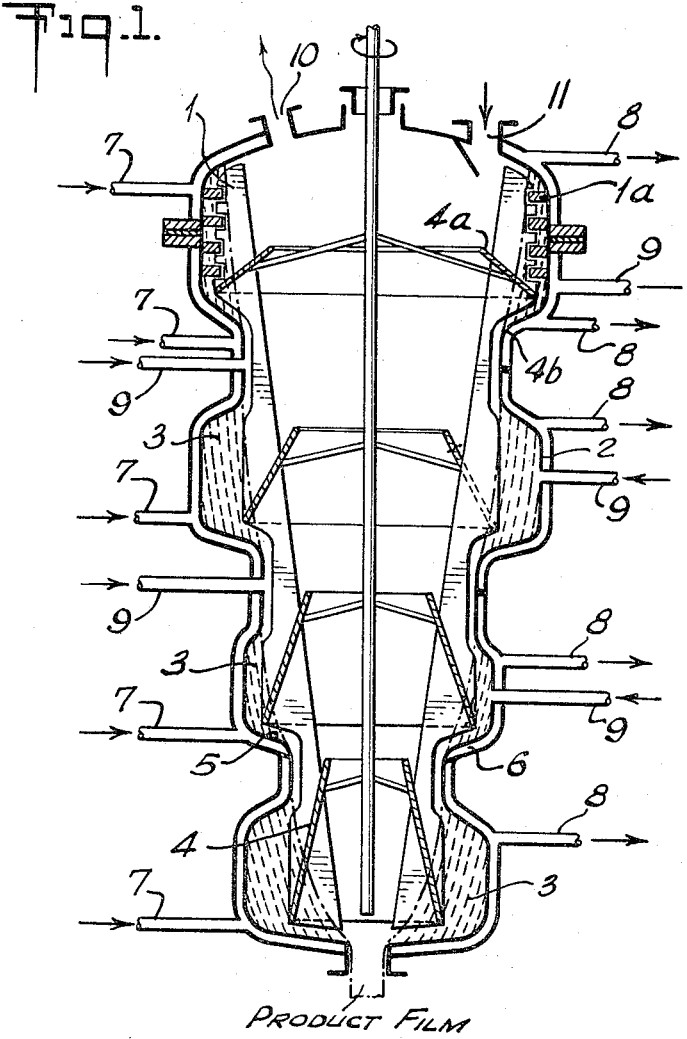

March 28, 1967     G. GOOSSENS     3,311,457

LIQUID CASCADE REACTOR

Filed Dec. 16, 1964

INVENTOR:
GUNTER GOOSSENS
BY
Morrison Kennedy & Campbell
ATTORNEYS.

United States Patent Office 3,311,457
Patented Mar. 28, 1967

3,311,457
LIQUID CASCADE REACTOR
Gunter Goossens, Rial, Domat-Ems, Grisons, Switzerland, assignor to Inventa A.G., fur Forschung und Patentverwertung Lucerne, Lucerne, Switzerland
Filed Dec. 16, 1964, Ser. No. 418,731
Claims priority, application Switzerland, Dec. 20, 1963, 15,701/63
3 Claims. (Cl. 23—283)

The present invention relates to liquid cascade reactors.

A reaction vessel for carrying out chemical reactions in a liquid base medium should meet the following requirements:

(1) It should be possible to keep the residence time of the reaction mixture of such length as may be desired.

(2) The residence-time spectrum should be as narrow as possible.

(3) The heat transfer should be as good as possible.

(4) There should be very large heating or cooling surfaces.

(5) The reaction medium should present a very large surface.

(6) A very intensive exchange of material should be possible.

(7) It should be possible to vary the content of reaction mixture, whereby a variable residence time with constant throughput is also afforded, as well as a variable throughput with constant residence time.

(8) There should be the possibility of introducing solids in addition to liquid.

Heretofore, for example, stirring vessel cascades have been proposed for solving this problem. It has also been possible for the cascade to be accommodated in an apparatus in the form of overflow chambers or trays. The good thermodynamic conditions required have been obtained by means of special inserts, such as supplementary heat-exchange surfaces and stirring members creating very intensive actions. Such constructions generally become extremely complicated as a result. Moreover, continuous adaptation of the throughput is not achieved in overflow chambers or trays.

Also known are cascade-type thin layer and spraying evaporators which, it is true, ensure narrow residence-time spectre, but are restricted in total residence time to short periods. Moreover, they are not suitable for introducing solid materials.

One object of the present invention is to provide a new and improved liquid cascade reactor which is substantially free of the drawbacks of the prior art described.

The liquid cascade reactor for carrying out chemical reactions in a liquid base medium, in accordance with the present invention, is characterized by a plurality of annular chambers arranged one above the other and so connected to one another by way of cylindrical necks, that the edges between the bottoms of the chambers and the necks are located on a paraboloid of revolution corresponding to that defined by the inner surface of the whirling material in the chambers. An impeller installed from above and having its blades immersed in the liquid in the chambers, causes the liquid reaction medium to rotate and thereby stay in the chambers. The individual annular chambers are advantageously provided with double jackets, so that they can be heated or cooled. Likewise, it is advantageous that the annular chambers be smaller in diameter in stages in the downward direction, so that the impeller can be installed from above as a whole.

Figure 2:
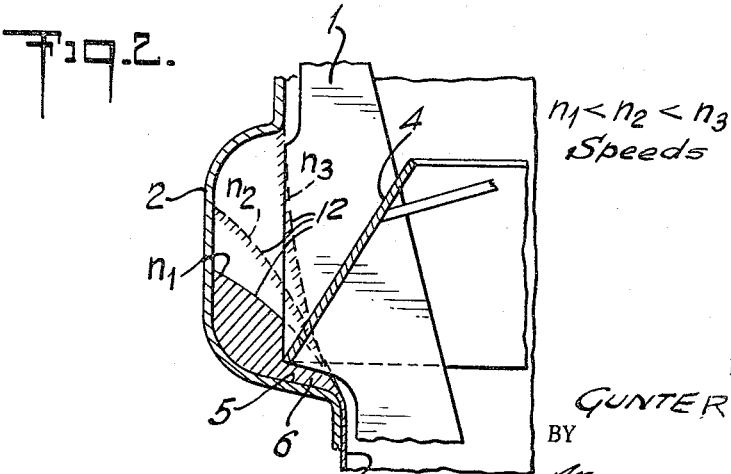

An apparatus according to the invention will be described with reference to the drawings, in which FIG. 1 shows a liquid cascade reactor in vertical section and FIG. 2 shows an enlarged part of an individual annular chamber, likewise in section.

In accordance with the present invention, the liquid cascade reactor of the present invention comprises a series of individual annular chambers 3 having inner walls 2 and separated by a series of restricted substantially cylindrical sections to form necks in the reactor between chambers. Operable in the reactor is an impeller with blades 1 having enlarged spaced sections extending into the annular chamber 3 respectively and carrying conical sheet-metal rings 4. Between the bottom edges of these rings 4 and the bottoms 5 of the annular chambers 3 are gaps 6 through which the reaction medium passes.

The reactor has double walls to form a jacket and the individual chambers 3 can be heated or cooled, and for that purpose, the jacket has an inlet 7 and an outlet 8 for a heating or cooling medium for each chamber, according to the nature of the reaction contemplated. Any liquid or gaseous substance can be introduced into the individual chambers 3 or into the necks located between the chambers, by means of the inlets 9. Waste gases are carried off by way of a duct 10, while a duct 11 serves to introduce solid materials, if required.

The impeller through its blades 1, sets the liquid reaction medium in rotation. The constrictions between the chambers 3 forming the necks are so graduated, that the inlet end of each neck emerges from the paraboloids of revolution which are formed on the inner surface of the rotating liquid in the annular chamber located just above said neck at different speeds of the impeller, and the speed of the impeller is so chosen, as to cause the inner surface of the rotating liquid to assume such parabolic contours, so as to allow this liquid to emerge from the inner surface of the liquid in the chamber as a thin layer or film over the wall of the neck below it. In this way, a cascade of annular bodies of liquid separated from one another is formed.

Very good transfer of heat is attained as a result of the high rate of flow along the walls 2 of the chambers 3. Owing to the annular form of the chambers 3, ratios of wetted wall surface to useful chamber volume are obtained, which come close to those of tube-type heat exchangers. In addition, the connecting necks between the chambers 3 are wetted by the film of the product overflowing from one chamber to the next. The ratio of free surface to useful volume lies between the corresponding values for conventional stirrer-equipped autoclaves and those for thin-layer exaporators. The necks between the chambers act as thin-layer evaporators.

The conditions for exchange of material are particularly favorable because non-stationary flow (turbulent), is attained. During tests with a model, it was observed that the surface curvature of the reaction medium outside the periphery of the impeller, shown in FIG. 2 is opposite the parabola form. This observed fact justifies the conclusion that the flow in each chamber 3 is partially non-stationary, and indicates that a good exchange of material can be expected. When a coloring substance is added, it is found that in fact, extremely good and rapid mixing is attained.

If the product content of the reactor is varied, while the throughput is kept constant, the residence time changes to a corresponding extent. If the throughput is to be varied, while the residence time remains unchanged, this can be achieved in the same manner. It is possible, thereby, to attain flexible adaptation of the operation of the reactor to the particular operating conditions of an installation connected to the reactor. The change in content is controlled in a simple manner by varying the speed of the impeller, since the capacity of the chamber is dependent on said speed. FIG. 2 shows the various liquid surfaces 12 which correspond to various speeds ($n_1$–$n_3$) in which $n_1 < n_2 < n_3$, and to various useful contents.

As in simple autoclaves, solid substances can be introduced in conventional manner through the inlet 11. These solid substances drop onto the uppermost conical ring 4a rotating with the impeller and pass from there through centrifugal forces into the uppermost annulus of liquid. Suitable devices 1a in this upper region of the reactor can be provided for reducing the sizes of the lumps of solid material.

The flow-through of the reaction medium takes place from top to bottom. If additional liquid or solid material is fed into a filled chamber, for example, at 11 in FIG. 1, an equal amount of the contents of the chamber passes over the bottom edge 4b of the chamber in the form of a film into the neck connnecting thereinto and to the next lower chamber. The chamber necks act as thin-layer evaporators.

Owing to the special nature of the design, all the requirements enumerated at the beginning herein, are met to a very high degree. The impeller speeds do not exceed 200 r.p.m. even in the case of smaller types, for example, with a useful content of 50 liters, so that special shaft packing and vibration problems do not occur.

While the invention has been described with particular reference to a specific embodiment, it is to be understood that it is not to be limited thereto but is to be construed broadly and restricted solely by the scope of the appended claims.

What I claim is:

1. A liquid ring cascade reactor for carrying out chemical reactions in a liquid base medium, comprising a plurality of peripheral chambers having outwardly bulging circumferential walls and arranged one above the other and connected to each other by intervening substantially cylindrical necks, said chambers comprising a top chamber and a bottom chamber and at least one intermediate chamber, each intermediate chamber having a top edge wall of larger interior diameter than its bottom edge wall, and each chamber below the top chamber having a top edge wall of substantially the same interior diameter as the bottom edge wall of the chamber above it and each chamber above the bottom chamber having a bottom edge wall of substantially the same interior diameter as the top edge wall of the chamber above it so that the interior edges of said edge walls are located on a paraboloid of revolution of a parabola on the vertical center line of the reactor, the parabola being below the bottom of the bottom chamber and the paraboloid being severed horizontally at the bottom of each neck and the remaining portion of the paraboloid being elevated to the top of the neck so that the successive chambers conform to the paraboloid as if the necks were omitted, means providing an inlet to the top chamber, and rotating means to intercept material entering through said inlet means and force said material into said chamber and comprising impeller blades immersed in the chambers respectively causing the liquid reaction medium to rotate and thereby to stay in the chambers during operation of the reactor.

2. A liquid ring cascade reactor as described in claim 1, wherein the annular chambers are provided with means by which the temperatures of the chambers may be individually varied.

3. Apparatus as in claim 1 wherein said rotating means includes at least one wing-shaped ring disposed beneath said inlet.

References Cited by the Examiner

UNITED STATES PATENTS

| 2,942,656 | 6/1960 | Rodenacker | 159—12 |
| 3,183,112 | 5/1965 | Gemassmer | 159—6 |
| 3,252,502 | 5/1966 | Eckardt et al. | 159—6 |

MORRIS O. WOLK, *Primary Examiner.*

JAMES H. TAYMAN, Jr., *Examiner.*